US008363728B2

(12) United States Patent
Zhang et al.

(10) Patent No.: US 8,363,728 B2
(45) Date of Patent: Jan. 29, 2013

(54) BLOCK BASED CODEC FRIENDLY EDGE DETECTION AND TRANSFORM SELECTION

(75) Inventors: Ximin Zhang, San Jose, CA (US); Ming-Chang Liu, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1144 days.

(21) Appl. No.: 12/148,582

(22) Filed: Apr. 18, 2008

(65) Prior Publication Data
US 2009/0262800 A1   Oct. 22, 2009

(51) Int. Cl.
*H04N 7/12* (2006.01)
(52) U.S. Cl. ........... 375/240.2; 375/240.08; 375/240.12; 375/240.18; 375/240.19; 375/240.26; 375/240.27
(58) Field of Classification Search ............. 375/240.18, 375/240.19, 240.12, 240.26, 240.27, 240.08, 375/240.2
See application file for complete search history.

(56) References Cited

U.S. PATENT DOCUMENTS

| 5,094,899 | A | 3/1992 | Rusek, Jr. |
| 5,635,994 | A | 6/1997 | Drexler et al. |
| 5,638,128 | A | 6/1997 | Hoogenboom et al. |
| 5,642,166 | A | 6/1997 | Shin et al. |
| 5,852,475 | A | 12/1998 | Gupta et al. |
| 6,049,623 | A | 4/2000 | Fuderer et al. |
| 6,278,736 | B1 | 8/2001 | De Haan et al. |
| 6,473,462 | B1 | 10/2002 | Chevance et al. |
| 6,658,059 | B1 | 12/2003 | Lu et al. |
| 6,744,916 | B1 | 6/2004 | Takahashi |
| 6,987,893 | B2 | 1/2006 | Kim |
| 7,203,234 | B1 * | 4/2007 | Zeng ................. 375/240.03 |
| 7,206,002 | B2 | 4/2007 | Kawamoto |

(Continued)

FOREIGN PATENT DOCUMENTS

| EP | 0 720 382 B1 | 7/1996 |
| WO | 87/05769 | 9/1987 |

(Continued)

OTHER PUBLICATIONS

Sanjeev Kumar et al., "Global Motion Estimation in Frequency and Spatial Domain" Department of Electrical and Computer Engineering, UCSD, La Jolla, California.

(Continued)

*Primary Examiner* — Sath V Perungavoor
*Assistant Examiner* — Geepy Pe
(74) *Attorney, Agent, or Firm* — Haverstock & Owens LLP

(57) ABSTRACT

Low complexity edge detection and DCT type selection method to improve the visual quality of H.264/AVC encoded video sequence is described. Encoding-generated information is reused to detect an edge macroblock. Variance and Mean Absolute Difference (MAD) of one macroblock shows a certain relationship that is able to be used to differentiate the edge macroblock and the non-edge macroblock. Also, the variance difference of neighbor macroblocks provides a hint for edge existence. Then, a block-based edge detection method uses this information. To determine the DCT type for each block, the detected edges are differentiated as visual obvious edge, texture-like edge, soft edge and strong edge. 8×8 DCT is used for texture-like edges and the 4×4 DCT is used for all the other edges. The result is an efficient and accurate edge detection and transform selection method.

33 Claims, 5 Drawing Sheets

U.S. PATENT DOCUMENTS

| | | |
|---|---|---|
| 7,260,148 B2 | 8/2007 | Sohm |
| 7,526,028 B2 * | 4/2009 | Sung et al. ............... 375/240.16 |
| 2005/0094852 A1 | 5/2005 | Kumar et al. |
| 2005/0094899 A1 | 5/2005 | Kim et al. |
| 2005/0100235 A1 | 5/2005 | Kong et al. |
| 2005/0135700 A1 | 6/2005 | Anderson |
| 2006/0045384 A1 | 3/2006 | De Haan |
| 2006/0050795 A1 | 3/2006 | Boroczky et al. |
| 2006/0083407 A1 | 4/2006 | Zimmermann et al. |
| 2006/0110062 A1 | 5/2006 | Chiang et al. |
| 2006/0139376 A1 | 6/2006 | Le Dinh et al. |

FOREIGN PATENT DOCUMENTS

| | | |
|---|---|---|
| WO | 92/19068 | 10/1992 |
| WO | 95/24096 | 9/1995 |
| WO | 2006/089557 A1 | 8/2006 |

OTHER PUBLICATIONS

Loy Hui Chein et al., "Robust Motion Estimation for Video Sequences Based on Phase-Only Correlation" Graduate School of Information Sciences, Tohoku University, Japan, Signal and Image Processing Aug. 23-25, 2004, Honolulu, Hawaii, USA pp. 441-446.

T. Vlachos, "Simple method for estimation of global motion parameters using sparse translation motion vector fields", Electronics Letters Jan. 8, 1998 vol. 34 No. 1.

Hao-Song Kong et al., "Edge Map Guided Adaptive Post-Filter for Blocking and Ringing Artifacts Removal", IEEE International Symposium on Circuits and Systems (ISCAS), vol. 3, p. 929-932, May 2004( IEEE Xplore).

L.Atzori, et al., "Low-Complexity Post-Processing for Artifact Reduction in Block-DCT Based Video Coding", Image Process, 2000, Proceedings 2000 International Conference on vol. 2, pp. 668-671, Feb. 2000.

H. Huu et al., "Simultaneous Coding Artifact Reduction and Sharpness Enhancement", Consumer Electronics, 2007, ICCR 2007, Jan. 2007, pp. 1-2.

Ling Shao et al., "Integrated Image enhancement and Artifacts Reduction Based on Frequency Bands Manipulation", Jul. 2007, pp. 292-295, Multimedia and Expo, 2007 IEEE International Conference.

Thomas Meier et al., "Reduction of Blocking Artifacts in Image and Video Coding", Apr. 1999, pp. 490-500, Circuits and Systems for Video Technology, IEEE Transactions on vol. 9, Issue 3.

Tai-Wai Chang et al., "A Novel Content-Adaptive Interpolation", 2005, pp. 6260-6263, Department of Electrical and Electronic Engineering, Hong Kong University of Science and Technology , Hong Kong.

Lei Zhang et al., "An Edge-Guided Image Interpolation Algorithm via Directional Filtering and Data Fusion", Aug. 2006, vol. 15, No. 8, pp. 2226-2238, IEEE Transactions on Image Processing.

* cited by examiner

Texture Block ← 100

```
90 98 90 98  90 98 90 98
98 90 98 90  98 90 98 90
90 98 90 98  90 98 90 98
98 90 98 90  98 90 98 90
90 98 90 98  90 98 90 98
98 90 98 90  98 90 98 90
90 98 90 98  90 98 90 98
98 90 98 90  98 90 98 90
```

VAR=16
MAD=4
VAR/MAD=MAD

Edge Block ← 102

```
90 90 90 90  90 99 99 90
90 90 90 90  90 99 99 90
90 90 90 90  90 99 99 90
90 90 90 90  90 99 99 90
90 90 90 90  90 99 99 90
90 90 90 90  90 99 99 90
90 90 90 90  90 99 99 90
90 90 90 90  90 99 99 90
```

VAR=15.18
MAD=2.25
VAR/MAD=3*MAD

Figure 1

BLOCK BASED CODEC FRIENDLY EDGE DETECTION AND TRANSFORM SELECTION

FIELD OF THE INVENTION

The present invention relates to the field of video encoding. More specifically, the present invention relates to enhancing the compression of video by selecting the appropriate transform based on the type of block.

BACKGROUND OF THE INVENTION

A video sequence consists of a number of pictures, usually called frames. Subsequent frames are very similar, thus containing a lot of redundancy from one frame to the next. Before being efficiently transmitted over a channel or stored in memory, video data is compressed to conserve both bandwidth and memory. The goal is to remove the redundancy to gain better compression ratios. A first video compression approach is to subtract a reference frame from a given frame to generate a relative difference. A compressed frame contains less information than the reference frame. The relative difference can be encoded at a lower bit-rate with the same quality. The decoder reconstructs the original frame by adding the relative difference to the reference frame.

A more sophisticated approach is to approximate the motion of the whole scene and the objects of a video sequence. The motion is described by parameters that are encoded in the bit-stream. Pixels of the predicted frame are approximated by appropriately translated pixels of the reference frame. This approach provides an improved predictive ability than a simple subtraction. However, the bit-rate occupied by the parameters of the motion model must not become too large.

In general, video compression is performed according to many standards, including one or more standards for audio and video compression from the Moving Picture Experts Group (MPEG), such as MPEG-1, MPEG-2, and MPEG-4. Additional enhancements have been made as part of the MPEG-4 part 10 standard, also referred to as H.264, or AVC (Advanced Video Coding). Under the MPEG standards, video data is first encoded (e.g. compressed) and then stored in an encoder buffer on an encoder side of a video system. Later, the encoded data is transmitted to a decoder side of the video system, where it is stored in a decoder buffer, before being decoded so that the corresponding pictures can be viewed.

The intent of the H.264/AVC project was to develop a standard capable of providing good video quality at bit rates that are substantially lower than what previous standards would need (e.g. MPEG-2, H.263, or MPEG-4 Part 2). Furthermore, it was desired to make these improvements without such a large increase in complexity that the design is impractical to implement. An additional goal was to make these changes in a flexible way that would allow the standard to be applied to a wide variety of applications such that it could be used for both low and high bit rates and low and high resolution video. Another objective was that it would work well on a very wide variety of networks and systems.

H.264/AVC/MPEG-4 Part 10 contains many new features that allow it to compress video much more effectively than older standards and to provide more flexibility for application to a wide variety of network environments. Some key features include multi-picture motion compensation using previously-encoded pictures as references, variable block-size motion compensation (VBSMC) with block sizes as large as 16×16 and as small as 4×4, six-tap filtering for derivation of half-pel luma sample predictions, macroblock pair structure, quarter-pixel precision for motion compensation, weighted prediction, an in-loop deblocking filter, an exact-match integer 4×4 spatial block transform, a secondary Hadamard transform performed on "DC" coefficients of the primary spatial transform wherein the Hadamard transform is similar to a fast Fourier transform, spatial prediction from the edges of neighboring blocks for "intra" coding, context-adaptive binary arithmetic coding (CABAC), context-adaptive variable-length coding (CAVLC), a simple and highly-structured variable length coding (VLC) technique for many of the syntax elements not coded by CABAC or CAVLC, referred to as Exponential-Golomb coding, a network abstraction layer (NAL) definition, switching slices, flexible macroblock ordering, redundant slices (RS), supplemental enhancement information (SEI) and video usability information (VUI), auxiliary pictures, frame numbering and picture order count. These techniques, and several others, allow H.264 to perform significantly better than prior standards, and under more circumstances and in more environments. H.264 usually performs better than MPEG-2 video by obtaining the same quality at half of the bit rate or even less.

MPEG is used for the generic coding of moving pictures and associated audio and creates a compressed video bit-stream made up of a series of three types of encoded data frames. The three types of data frames are an intra frame (called an I-frame or I-picture), a bi-directional predicated frame (called a B-frame or B-picture), and a forward predicted frame (called a P-frame or P-picture). These three types of frames can be arranged in a specified order called the GOP (Group Of Pictures) structure. I-frames contain all the information needed to reconstruct a picture. The I-frame is encoded as a normal image without motion compensation. On the other hand, P-frames use information from previous frames and B-frames use information from previous frames, a subsequent frame, or both to reconstruct a picture. Specifically, P-frames are predicted from a preceding I-frame or the immediately preceding P-frame.

Frames can also be predicted from the immediate subsequent frame. In order for the subsequent frame to be utilized in this way, the subsequent frame must be encoded before the predicted frame. Thus, the encoding order does not necessarily match the real frame order. Such frames are usually predicted from two directions, for example from the I- or P-frames that immediately precede or the P-frame that immediately follows the predicted frame. These bidirectionally predicted frames are called B-frames.

There are many possible GOP structures. A common GOP structure is 15 frames long, and has the sequence I_BB_P_BB_P_BB_P_BB_P_BB_. A similar 12-frame sequence is also common. I-frames encode for spatial redundancy, P and B-frames for both temporal redundancy and spatial redundancy. Because adjacent frames in a video stream are often well-correlated, P-frames and B-frames are only a small percentage of the size of I-frames. However, there is a trade-off between the size to which a frame can be compressed versus the processing time and resources required to encode such a compressed frame. The ratio of I, P and B-frames in the GOP structure is determined by the nature of the video stream and the bandwidth constraints on the output stream, although encoding time may also be an issue. This is particularly true in live transmission and in real-time environments with limited computing resources, as a stream containing many B-frames can take much longer to encode than an I-frame-only file.

B-frames and P-frames require fewer bits to store picture data, generally containing difference bits for the difference between the current frame and a previous frame, subsequent frame, subsequent frame, or both. B-frames and P-frames are thus used to reduce redundancy information contained across frames. In operation, a decoder receives an encoded B-frame or encoded P-frame and uses a previous or subsequent frame to reconstruct the original frame. This process is much easier and produces smoother scene transitions when sequential frames are substantially similar, since the difference in the frames is small.

Each video image is separated into one luminance (Y) and two chrominance channels (also called color difference signals Cb and Cr). Blocks of the luminance and chrominance arrays are organized into "macroblocks," which are the basic unit of coding within a frame.

In the case of I-frames, the actual image data is passed through an encoding process. However, P-frames and B-frames are first subjected to a process of "motion compensation." Motion compensation is a way of describing the difference between consecutive frames in terms of where each macroblock of the former frame has moved. Such a technique is often employed to reduce temporal redundancy of a video sequence for video compression. Each macroblock in the P-frames or B-frame is associated with an area in the previous or next image that it is well-correlated, as selected by the encoder using a "motion vector." The motion vector that maps the macroblock to its correlated area is encoded, and then the difference between the two areas is passed through the encoding process.

Conventional video codecs use motion compensated prediction to efficiently encode a raw input video stream. The macroblock in the current frame is predicted from a displaced macroblock in the previous frame. The difference between the original macroblock and its prediction is compressed and transmitted along with the displacement (motion) vectors. This technique is referred to as inter-coding, which is the approach used in the MPEG standards.

One of the most time-consuming components within the encoding process is motion estimation. Motion estimation is utilized to reduce the bit rate of video signals by implementing motion compensated prediction in combination with transform coding of the prediction error. Motion estimation-related aliasing is not able to be avoided by using inter-pixel motion estimation, and the aliasing deteriorates the prediction efficiency. In order to solve the deterioration problem, half-pixel interpolation and quarter-pixel interpolation are adapted for reducing the impact of aliasing. To estimate a motion vector with quarter-pixel accuracy, a three step search is generally used. In the first step, motion estimation is applied within a specified search range to each integer pixel to find the best match. Then, in the second step, eight half-pixel points around the selected integer-pixel motion vector are examined to find the best half-pixel matching point. Finally, in the third step, eight quarter-pixel points around the selected half-pixel motion vector are examined, and the best matching point is selected as the final motion vector. Considering the complexity of the motion estimation, the integer-pixel motion estimation takes a major portion of motion estimation if a fill-search is used for integer-pixel motion estimation. However, if a fast integer motion estimation algorithm is utilized, an integer-pixel motion vector is able to be found by examining less than ten search points. As a consequence, the computation complexity of searching the half-pixel motion vector and quarter-pixel motion vector becomes dominant.

Edge detection is a problem of fundamental importance in image and video analysis. In typical images, edges characterize object boundaries and are therefore useful for segmentation, registration and identification of objects in a scene. Since edge detection is fundamental to many image processing and computer graphic applications, edge detection has been investigated for many years. In general, state of the art edge detection methods are able to be categorized into two groups, search-based such as Sobel edge detection and zero-crossing based. These methods require conducting extensive pixel level calculation such as derivative calculation. The high complexity of the calculations prohibits their utilization in real-time applications such as video encoding.

SUMMARY OF THE INVENTION

Low complexity edge detection and DCT type selection method to improve the visual quality of H.264/AVC encoded video sequence is described. Encoding-generated information is reused to detect an edge macroblock. Variance and Mean Absolute Difference (MAD) of one macroblock shows a certain relationship that is able to be used to differentiate the edge macroblock and the non-edge macroblock. Also, the variance difference of neighbor macroblocks provides a hint for edge existence. Then, a block-based edge detection method uses this information. To determine the DCT type for each block, the detected edges are differentiated as visual obvious edge, texture-like edge, soft edge and strong edge. 8×8 DCT is used for texture-like edges and the 4×4 DCT is used for all the other edges. The result is an efficient and accurate edge detection and transform selection method.

In one aspect, a method of enhancing video encoding implemented on a computing device comprises classifying a macroblock as one of a first block classification and a second block classification and transforming the macroblock according to a first transform scheme if the macroblock is classified as the first block classification and transforming the macroblock according to a second transform scheme if the macroblock is classified as the second block classification. The first block classification is an edge block and the second block classification is a non-edge block. The first block classification further includes a flat block, an obvious edge block, a subjective obvious but objective weak edge block and a soft edge block. The second block classification further includes a texture-like edge block. The first transform scheme is a 4×4 discrete cosine transform and the second transform scheme is an 8×8 discrete cosine transform. The computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a method of detecting an edge block and selecting a transform implemented on a computing device comprises detecting an edge block based on a block variance to Mean Absolute Difference (MAD) ratio, detecting the edge block based on a neighbor block comparison, differentiating the edge block based on texture-like edge block differentiation, differentiating the edge block based on soft edge block differentiation, eliminating the edge block using isolated edge block elimination and selecting a transform based on the edge block. The transform selected is a 4×4 discreet cosine transform if one of an edge macroblock and a flat macroblock is detected. The transform selected is an 8×8 discreet cosine transform if one of a texture-like edge macroblock and a non-edge macroblock is detected. The method further comprises detecting the edge block based on a quantization parameter adaptive threshold comparison. Detecting the edge block based on the block variance to MAD ratio includes comparing the block variance to a threshold and an equation, $((MAD+n1)\gg n2+K)*MAD$, to determine if the block is an edge. Detecting the neighbor block comparison uses additional variance information to adjust K in equation, $((MAD+n1)\gg n2+K)*MAD$. The neighbor block comparison uses previous block edge detection results to adjust K in equation, $((MAD+n1)\gg n2+K)*MAD$. The texture-like edge block differentiation includes dividing the block into four sub-blocks, calculating variances for the sub-blocks and using the variances to determine if a first set of conditions is met to determine if the block is a texture-like edge block. The soft edge block differentiation includes dividing the block into four sub-blocks, calculating variances for the sub-blocks and using the variances to determine if a second set of conditions is met to determine if the block is a soft edge block. The isolated edge block elimination includes denoting the block as a non-edge block if no neighboring blocks are edge blocks. The computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a device comprises a memory for storing an application, the application for: implementing block variance to Mean Absolute Difference (MAD) ratio-based edge detection, implementing 4-neighbor block comparison-based edge detection, implementing texture-like edge block differentiation, implementing soft edge block differentiation, implementing isolated edge block elimination and selecting a transform and a processing component coupled to the memory, the processing component for executing the application. The transform selected is a 4×4 discreet cosine transform if one of an edge macroblock and a flat macroblock is detected. The transform selected is an 8×8 discreet cosine transform if one of a texture-like edge macroblock and a non-edge macroblock is detected. The block variance to MAD ratio-based edge detection includes comparing the block variance to a threshold and an equation, $((MAD+n1)\gg n2+K)*MAD$, to determine if the block is an edge. The 4-neighbor block comparison-based edge detection uses additional variance information to adjust K in equation, $((MAD+n1)\gg n2+K)*MAD$. The 4-neighbor block comparison-based edge detection uses previous block edge detection results to adjust K in equation, $((MAD+n1)\gg n2+K)*MAD$. The texture-like edge block differentiation includes dividing the block into four sub-blocks, calculating variances for the sub-blocks and using the variances to determine if a first set of conditions is met to determine if the block is a texture-like edge block. The soft edge block differentiation includes dividing the block into four sub-blocks, calculating variances for the sub-blocks and using the variances to determine if a second set of conditions is met to determine if the block is a soft edge block. The isolated edge block elimination includes denoting the block as a non-edge block if no neighboring blocks are edge blocks. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a system implemented on a computing device comprises a block variance to Mean Absolute Difference (MAD) ratio-based edge detection component for detecting an edge block, a 4-neighbor block comparison-based edge detection component coupled to the block variance to MAD ratio-based edge detection component, the 4-neighbor block comparison-based edge detection component for detecting the edge block, a texture-like edge block differentiation component coupled to the 4-neighbor block comparison-based edge detection component, the texture-like edge block differentiation component for differentiating the edge block, a soft edge block differentiation component coupled to the texture-like edge block differentiation component, the soft edge block differentiation component for differentiating the edge block, an edge block elimination component coupled to the soft edge block differentiation component, the edge block elimination component for eliminating the edge block and a transform selection component coupled to the edge block elimination component, the transform selection component for selecting a transform. At least one of the block variance to MAD ratio-based edge detection component, the 4-neighbor block comparison-based edge detection component, the texture-like edge block differentiation component, the soft edge block differentiation component, the edge block elimination component and the transform selection component is implemented in hardware. At least one of the block variance to MAD ratio-based edge detection component, the 4-neighbor block comparison-based edge detection component, the texture-like edge block differentiation component, the soft edge block differentiation component, the edge block elimination component and the transform selection component is implemented in software. The transform selection component selects a 4×4 discreet cosine transform if one of an edge macroblock and a flat macroblock is detected. The transform selection component selects an 8×8 discreet cosine transform if one of a texture-like edge macroblock and a non-edge macroblock is detected. The block variance to MAD ratio-based edge detection component compares the block variance to a threshold and an equation, $((MAD+n1)\gg n2+K)*MAD$, to determine if the block is an edge. The 4-neighbor block comparison-based edge detection component uses additional variance information to adjust K in equation, $((MAD+n1)\gg n2+K)*MAD$. The 4-neighbor block comparison-based edge detection component uses previous block edge detection results to adjust K in equation, $((MAD+n1)\gg n2+K)*MAD$. The texture-like edge block differentiation component divides the block into four sub-blocks, calculating variances for the sub-blocks and using the variances to determine if a first set of conditions is met to determine if the block is a texture-like edge block. The soft edge block differentiation includes dividing the block into four sub-blocks, calculating variances for the sub-blocks and using the variances to determine if a second set of conditions is met to determine if the block is a soft edge block. The isolated edge block elimination includes denoting the block as a non-edge block if no neighboring blocks are edge blocks. The computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, an application processed by a processor comprises a detection component for detecting an edge in a block and a transform selection component coupled to the detection component, the transform selection component for selecting a transform and transforming the block. The transform is a 4×4 discrete cosine transform if the edge is detected in the block and the transform is an 8×8 discrete cosine transform if the edge is not detected in the block. The edge in the block further includes a flat block, an obvious edge block, a subjective obvious but objective weak edge block and a soft edge block. The edge not in the block includes a texture-like edge block. The application is executed on a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

BRIEF DESCRIPTION OF THE DRAWINGS

FIG. 1 illustrates the block statistics difference between edge and texture.

DETAILED DESCRIPTION OF THE PREFERRED EMBODIMENT

Figure 2:
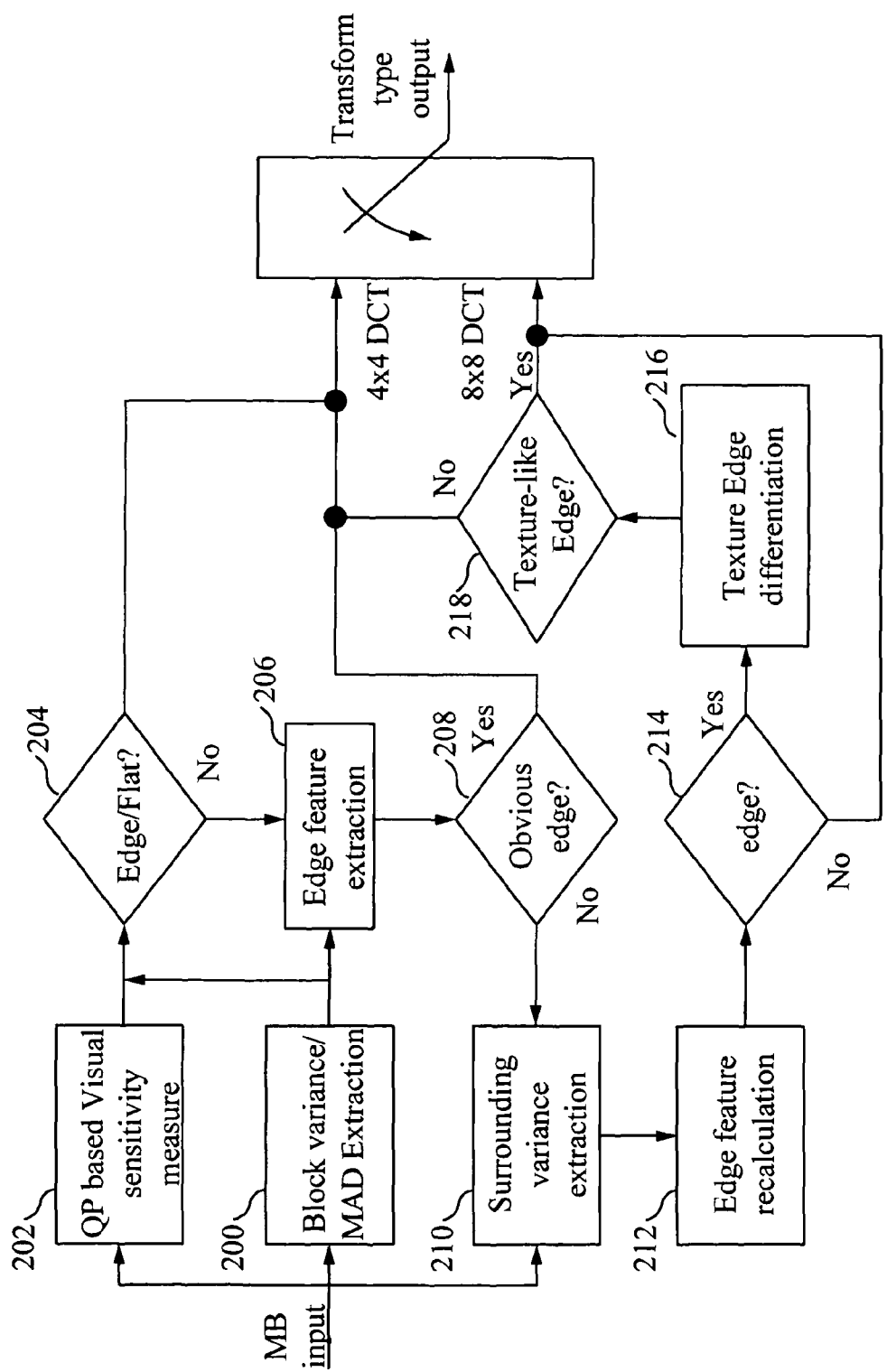
FIG. 2 illustrates a flowchart of a method of block-based edge detection & transform type selection.

H.264/AVC design emerged with an improvement in coding efficiency typically by a factor of two over MPEG-2. It is desirable to use the superior coding efficiency of H.264/AVC to directly benefit visual quality to the greatest extent. Among many important techniques in the H.264/AVC standard, adaptive transform selection plays an important role to improve the compression efficiency. Visual fidelity is able to be significantly improved, particularly for movie sequences, by adaptively selecting 4×4 transforms and 8×8 transforms.

The 4×4 transform achieves better visual results in an edge area than the 8×8 transform. On the other hand, the 8×8 transform achieves better visual results than the 4×4 transform in a texture area. Therefore, accurate edge detection is required to obtain quality transform selection results. According to the H.264/AVC standard, the 8×8 Discrete Cosine Transform (DCT) is only able to be used in inter predicted macroblocks when the sub-macroblock partition for motion-compensated prediction is greater than or equal to 8. For intra predicted macroblocks, the 8×8 DCT is only able to be used for an 8×8 intra predicted macroblock, and the 4×4 DCT is only able to be used for 4×4 or 16×16 intra predicted macroblocks. Therefore, if the DCT type is determined before the mode decision, the calculation of the prediction cost is able to be skipped for some specified modes, thus reducing complexity.

Characteristics Analysis of Edge & Texture Macroblock

Edges usually reflect the abrupt intensity change in the image. The higher the intensity changes, the sharper the edge is. In order to differentiate an edge macroblock by using block statistics, the variance and Mean Absolute Difference (MAD) of one block shows a certain relationship that is able to be used to differentiate the edge block and the non-edge block. Assuming two blocks have similar variance, and one is an edge block and the other is a non-edge block, the variance to MAD ratio of the edge block is usually higher than the ratio of the non-edge block. FIG. 1 illustrates the block statistics difference between edge and texture. The left side shows an 8×8 texture block 100 with the variance equal to 16 and the MAD equal to 4. The variance to MAD ratio, 4, is exactly equal to the value of the MAD. The right side shows an 8×8 edge block 102 with the variance equal to 15.18 and the MAD equal to 2.25. The variance to MAD ratio, 6.747 is almost three times the value of the MAD. Even if the variance of the edge block is less than the variance of the texture block, the variance to MAD ratio in the edge block is much higher.

Besides the intrinsic feature of the edge block, the edge block usually demonstrates different statistics from the surrounding non-edge blocks. Typically, the variance of the edge block is much higher than its neighboring non-edge blocks. If the variance of one block is much higher than the variance of any of its four-neighbor blocks, the possibility that the current block is an edge block is higher. However, if the variance of the current block is similar to one of its neighboring blocks, and the neighboring block has been detected as an edge block, then the possibility that the current block is an edge block is higher.

Another feature to differentiate the texture and the edge block is its sub-block variance. In most texture blocks, the minimum sub-block variance is within a certain range, and the ratio between the maximum sub-block variance and the minimum sub-block variance is relatively small. On the contrary, in most edge blocks, the ratio between the maximum sub-block variance and the minimum sub-block variance is very large. Based on this information, the block statistic-based edge detection & transform type selection methods are described below.

Block Statistics Based Edge Detection & Transform Type Selection

FIG. 2 illustrates a flowchart of a method of block-based edge detection & transform type selection. In the step 200, for each macroblock, the variance and the MAD value are extracted/determined. In the step 202, two Quantization Parameter (QP)-based visual sensitivity thresholds are calculated, a lower threshold and an upper threshold. In some embodiments, the steps 200 and 202 occur in parallel.

In the step 204, if the current macroblock variance is less than the lower threshold, the current macroblock is determined as a flat macroblock, and 4×4 DCT is selected. In the step 204, if the current macroblock variance is larger than the upper threshold, the current macroblock is determined as an edge macroblock, and 4×4 DCT is selected.

The QP-based visual threshold sensitivity thresholds are based on the following reasoning. With the increase of the QP value, more and more texture is removed no matter what the transform type is used. The light texture area is able to become a flat area after quantization, and the heavy texture area is able to become a light texture area after quantization. Under these scenarios, the threshold value based on the original picture needs to be adjusted. In some embodiments, if the QP value is less than 18, the lower threshold adopts the lower constant value; otherwise, if the QP value is less than 38, the lower threshold is linearly increased. If the QP value is larger than 38, the lower threshold is kept the same as the value for QP equal to 38. The constant values for QP less than 18 and QP greater than 38 are determined based on empirical results of many video sequences. The upper threshold is able to be adjusted similarly to the procedure used in the lower threshold calculation. Since the quality impact is relatively minor, in order to reduce the complexity, the upper threshold is able to also use a constant value. The constant value is determined based on empirical results on many video sequences.

If the current macroblock variance is less than the upper threshold and larger than the lower threshold, the current macroblock edge feature is calculated based on its variance and MAD, in the step 206. Based on this calculation, it is determined if the macroblock is an obvious edge macroblock, in the step 208. If the edge feature is very strong, the current macroblock is detected as an objective obvious edge macroblock, 4×4 DCT is selected.

If the edge feature is not strong enough, the information of the surrounding macroblocks is extracted, in the step 210. Based on the surrounding information, the edge feature is recalculated, in the step 212. If the edge feature shows the current macroblock is a non-edge macroblock in the step 214, 8×8 DCT is selected. If the edge feature shows the current macroblock is an edge macroblock in the step 214, texture edge differentiation is performed, in the step 216.

In the step 218, it is determined if the macroblock is a texture-like edge macroblock. Based on the result of texture edge differentiation, 8×8 DCT is selected for a texture-like edge macroblock, and 4×4 DCT is selected for another edge macroblock.

During the encoding process, block variance and MAD are usually calculated to perform rate control. The methods described herein utilize this existing information, thus the overhead on the encoder is negligible.

Block Statistics Based Edge Detection & Categorization

Since an edge is basically the subjective human visual system impression instead of a pure objective measure, edge feelings are able to be obtained from many different objective measures. It is desirable to categorize the edge blocks into different groups. In some embodiments, edge blocks are categorized into four groups: 1) objective obvious edge block, 2) subjective obvious but objective weak edge block, 3) texture like edge block and 4) soft edge block.

Figure 3:
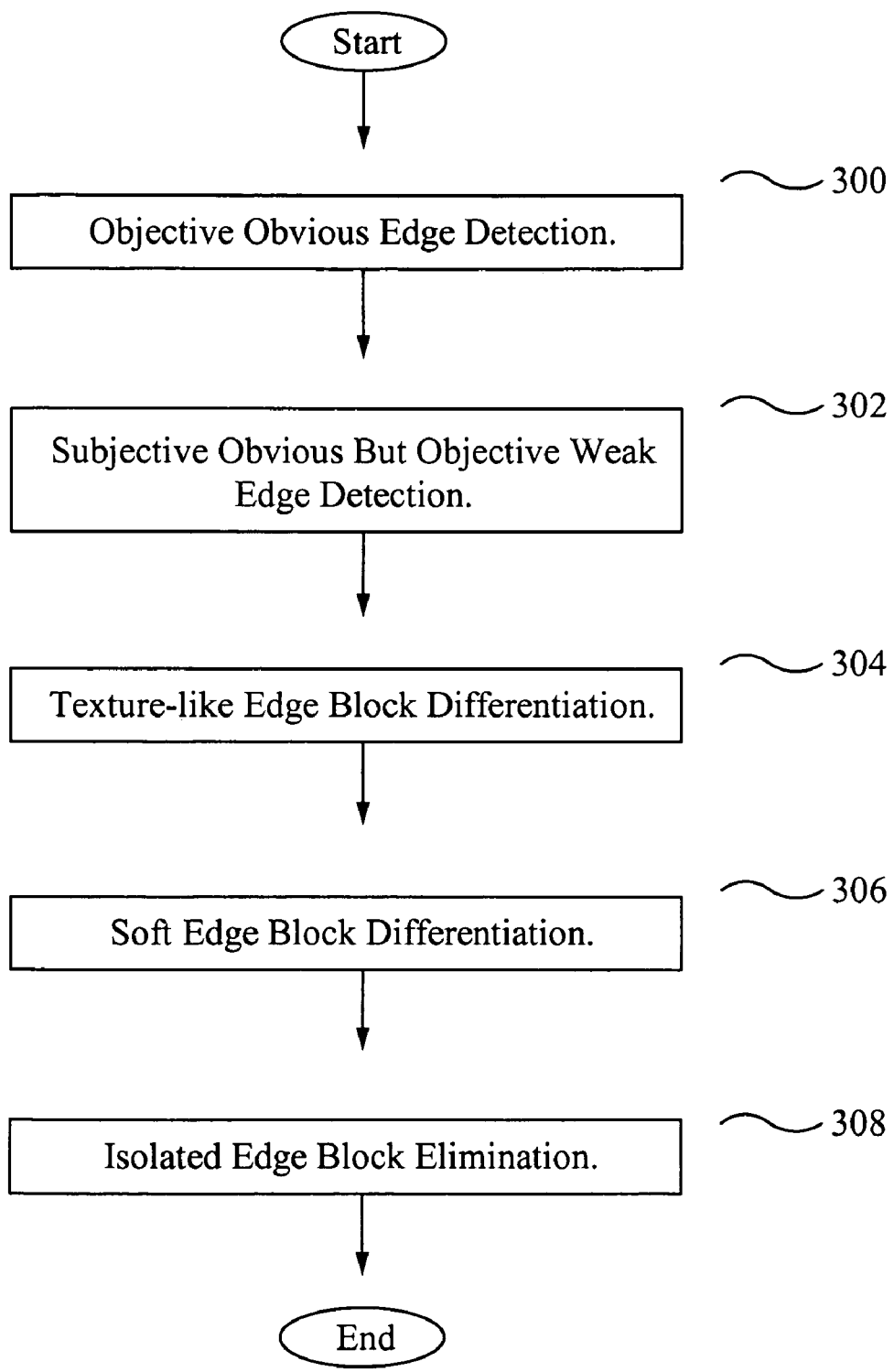
FIG. 3 illustrates a flowchart of a method of categorizing blocks.

FIG. 3 illustrates a flowchart of a method of categorizing blocks.

In the step 300, objective obvious edges are detected. As described above, the block variance to MAD ratio provides the information to differentiate the edge block and the non-edge block. Therefore, to detect an objective obvious edge block, the following steps are used. For each block, the variance and MAD are calculated. Calculate the value of equation 1:

$$((MAD+n1) \gg n2+K)*MAD \qquad (1)$$

where n1, n2 and K are three constants. The constants n1 and n2 are related to the block size. If an 8×8 block is used, the constant n1=32 and the constant n2=6. If a 16×16 block is used, the constant n1=128 and the constant n2=8. The constant K is obtained based on numerical empirical results.

If the variance is larger than a threshold T1, and the variance is larger than the value of the result of the above equation, the current block is detected as an edge block. Otherwise, if the variance is larger than a threshold T1, the block needs further analysis.

Figure 4:
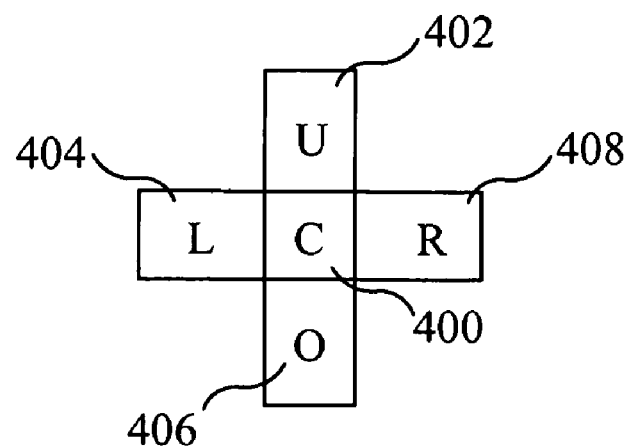
FIG. 4 illustrates positions of neighboring blocks used to detect subjective obvious but objective weak edge blocks.

In the step 302, subjective obvious but objective weak edge blocks are detected. When the objective edge features are not strong, the step 300 is not able to detect them. To solve this problem, the surrounding block information is able to be used. The variance of an edge block is usually higher than its neighboring non-edge block. If the variance of one block is much higher than the variance of any of its four neighboring blocks, the possibility that the current block is an edge block is higher. On the other hand, if the variance of the current block is similar to the one of its neighboring bocks, and this neighboring block has been detected as an edge block, then the possibility that the current block is an edge macroblock is higher. Thus, the information of the four neighboring blocks is able to be used to detect the objective weak edge block. The positions of the blocks are illustrated in FIG. 4. C denotes a current block 400, U denotes an upper block 402, L denotes a left block 404, O denotes a lower block 406 and R denotes a right block 408.

The basics of the method are to use the four neighboring blocks' information to adjust the value of the constant K in equation 1. The adjustment is performed as follows:

If $Var(C) > m1*Var(U)$ and $Var(C) > m1*Var(O)$, $K=K-1$;

If $Var(C) > m1*Var(L)$ and $Var(C) > m1*Var(R)$, $K=K-1$;

If the upper block U is detected as an edge block and $|Var(C)-Var(U)| < Var(U) \gg 1$, $K=K-1$;

If the left block L is detected as an edge block and $|Var(C)-Var(L)| < Var(L) \gg 1$, $K=K-1$;

After the adjustment, the procedures in Step 1 are applied to determine if the current block is an edge block or a non-edge block. In the above condition checks, m1 is a constant obtained based on empirical results.

In the step 304, texture-like edge blocks are differentiated. Texture-like edge blocks usually show some unique characteristics compared to other edge blocks. For instance, in most texture-like blocks, the minimum sub-block variance is within a certain range, and the ratio between the maximum sub-block variance and the minimum sub-block variance is relatively small. Texture-like blocks usually demonstrate similar statistics as their neighbors. Based on this information, a block is able to be divided into four sub-blocks, and the variances of the sub-blocks are calculated. Then, the following condition checks are used to further differentiate the detected edge blocks. If the following conditions are satisfied, the current edge block is able to be detected as a texture-like edge block.

$Min(Var_{sub}(C)) > T2$ and $Min(Var_{sub}(C)) < T3$ and $Max(Var_{sub}(C)) > T4$.

$Var(C) <= m1*Var(U)$ or $Var(C) <= m1*Var(O)$ or $Var(C) <= m1*Var(L)$ or $Var(C) <= m1*Var(R)$.

At least one surrounding block is not an edge block.

In the above, T2, T3 and T4 are three threshold values obtained based on empirical results.

In the step 306, soft edge blocks are differentiated. A soft edge usually reflects the gradual lighting change on the object. The following condition checks are used to differentiate it from the detected edge blocks. If the following conditions are satisfied, the current edge block is detected as a soft edge block.

$Var(C) > m2*Max(Var_{sub}(C))$ and $Max(Var_{sub}(C)) > T5$

In the above, the values m2 and T5 are obtained based on empirical results.

Figure 5:
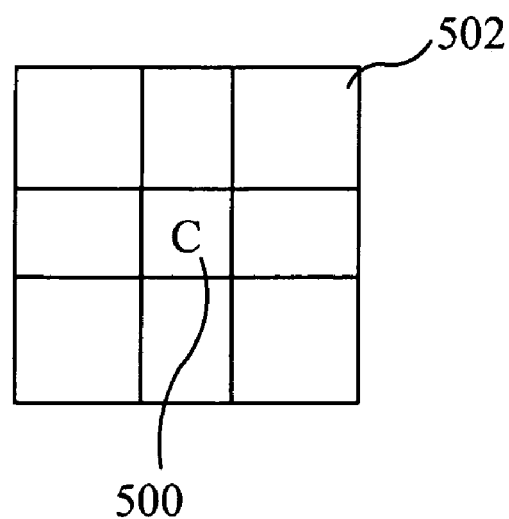
FIG. 5 illustrates eight neighboring blocks used to eliminate an isolated edge block.

In the step 308, isolated edge blocks are eliminated. By applying the above four step procedure on an image, all of the blocks are categorized into five groups: non-edge block, objective obvious edge block, objective weak edge block, texture-like edge block and soft edge block. According to the human visual system, edges usually should extend to a certain length. Therefore, an isolated edge block is denoted as a non-edge block if none of its eight neighboring blocks is an edge block. The eight neighbor blocks 502 around the center block 500 are shown in FIG. 5.

The above steps/methods are able to be applied to any block size. Since a 16×16 based macroblock is used in the current image/video encoding applications, 16×16 and 8×8 sub-blocks are described in detail.

Figure 6:
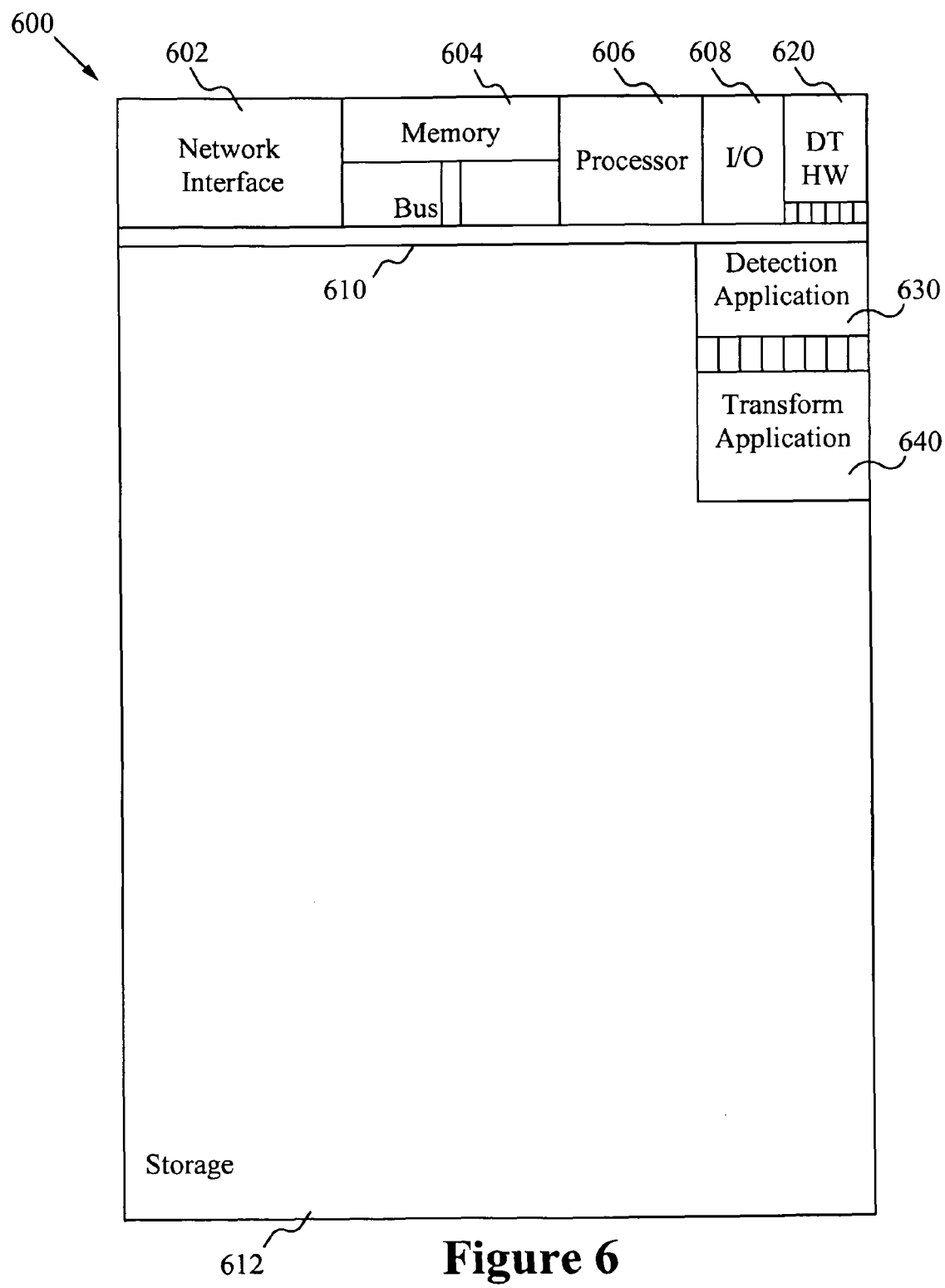
FIG. 6 illustrates a block diagram of an exemplary computing device.

FIG. 6 illustrates a block diagram of an exemplary computing device 600. The computing device 600 is able to be used to acquire, store, compute, communicate and/or display information such as images and videos. For example, a computing device 600 acquires a video, and then the acquired video is compressed using block based edge detection and transform selection. In general, a hardware structure suitable for implementing the computing device 600 includes a network interface 602, a memory 604, a processor 606, I/O device(s) 608, a bus 610 and a storage device 612. The choice of processor is not critical as long as a suitable processor with sufficient speed is chosen. The memory 604 is able to be any conventional computer memory known in the art. The storage device 612 is able to include a hard drive, CDROM, CDRW, DVD, DVDRW, flash memory card or any other storage device. The computing device 600 is able to include one or more network interfaces 602. An example of a network interface includes a network card connected to an Ethernet or other type of LAN. The I/O device(s) 608 are able to include one or more of the following: keyboard, mouse, monitor, display, printer, modem, touchscreen, button interface and other devices. In some embodiments, detection application(s) 630 used to perform the edge detection are likely to be stored in the storage device 612 and memory 604 and processed as applications are typically processed. In some embodiments, transform selection application(s) 640 used to perform the transform selections and transforms are likely to be stored in the storage device 612 and memory 604 and processed as applications are typically processed. In some embodiments, at least one of a block variance to MAD ratio-based edge detection component, a 4-neighbor block comparison-based edge detection component, a texture-like edge block differentiation component, a soft edge block differentiation component, an edge block elimination component and a transform selection component is included in the applications 630, 640. In some embodiments, detection and/or transform hardware 620 is included. For example, in some embodiments, at least one of a block variance to MAD ratio-based edge detection component, a 4-neighbor block comparison-based edge detection component, a texture-like edge block differentiation component, a soft edge block differentiation component, an edge block elimination component and a transform selection component is included in the hardware 620. Although, the computing device 600 in FIG. 6 includes applications 630 and 640 and hardware 620 for edge detection and transform selection, the edge detection and transform selection are able to be implemented on a computing device in hardware, firmware, software or any combination thereof. More or less components shown in FIG. 6 are able to be included in the computing device 600.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television, a home entertainment system or any other suitable computing device.

For example, an exemplary use of the camcorder includes acquiring a video such as a video of a wedding celebration which is then encoded by an encoder within the camcorder. Furthermore, the encoder incorporates the methods and systems described herein to perform the encoding more efficiently with better quality. To play back the video on the camcorder, the encoded video is decoded by a decoder and is then presented on the display for viewers to watch the video. Since the videos/images are encoded with better quality, when played back, the viewers will be able to view clearer videos/images.

To utilize block-based edge detection and transform selection, a computing device operates as usual, but the encoding/compression process is improved in that it is more efficient and more accurate by implementing block-based edge detection and transform selection. The utilization of the computing device from the user's perspective is similar or the same as one that uses standard compression. For example, the user still simply turns on a digital camcorder and uses the camcorder to record a video. The block-based edge detection and transform selection is able to automatically improve the compression process without user intervention. The block-based edge detection and transform selection is able to be used anywhere that requires video encoding/compression. Many applications are able to utilize the block-based edge detection and transform selection process.

In operation, block-based edge detection and transform selection improves the compression process by determining if a block is an edge or not and performing a transform based on whether the block is an edge or not. First, the block is determined to be an edge or flat based on block variance to MAD ratio. Then, if the block is not clearly an edge, subsequent methods are used to determine if the block is an objective obvious edge, a subjective obvious but objective weak edge, a texture-like edge or a soft edge. If the block is determined to be an appropriate type of edge, then one transform is implemented on the block. If the block is determined not to be an appropriate type of edge, then another transform is implemented on the block. By using one transform for edges and a different transform for non-edges, the efficiency and quality of the compression is improved.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of detecting an edge block and selecting a transform implemented on a computing device, the method comprising:
   a. detecting an edge block based on a block variance to Mean Absolute Difference (MAD) ratio;
   b. detecting the edge block based on a neighbor block comparison;
   c. differentiating the edge block based on texture-like edge block differentiation;
   d. differentiating the edge block based on soft edge block differentiation;
   e. eliminating the edge block using isolated edge block elimination; and
   f. selecting a transform from a plurality of transforms based on the edge block.

2. The method of claim 1 wherein the transform selected is a 4×4 discrete cosine transform if one of an edge macroblock and a flat macroblock is detected.

3. The method of claim 1 wherein the transform selected is an 8×8 discrete cosine transform if one of a texture-like edge macroblock and a non-edge macroblock is detected.

4. The method of claim 1 further comprising detecting the edge block based on a quantization parameter adaptive threshold comparison.

5. The method of claim 1 wherein detecting the edge block based on the block variance to MAD ratio includes comparing the block variance to a threshold and an equation, $((MAD+n1)>>n2+K)*MAD$, to determine if the block is an edge, wherein n1, n2 and K are constants, wherein n1 and n2 are related to block size and K is based on numerical empirical results.

6. The method of claim 1 wherein detecting the neighbor block comparison uses additional variance information to adjust K in equation, $((MAD+n1)>>n2+K)*MAD$, wherein n1, n2 and K are constants, wherein n1 and n2 are related to block size and K is based on numerical empirical results.

7. The method of claim 1 wherein the neighbor block comparison uses previous block edge detection results to adjust K in equation, $((MAD+n1)>>n2+K)*MAD$, wherein n1, n2 and K are constants, wherein n1 and n2 are related to block size and K is based on numerical empirical results.

8. The method of claim 1 wherein the texture-like edge block differentiation includes dividing the block into four sub-blocks, calculating variances for the sub-blocks and using the variances to determine if a first set of conditions is met to determine if the block is a texture-like edge block.

9. The method of claim 1 wherein the soft edge block differentiation includes dividing the block into four sub-blocks, calculating variances for the sub-blocks and using the variances to determine if a second set of conditions is met to determine if the block is a soft edge block.

10. The method of claim 1 wherein the isolated edge block elimination includes denoting the block as a non-edge block if no neighboring blocks are edge blocks.

11. The method of claim 1 wherein the computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

12. A device comprising:
  a. a memory for storing an application, the application for:
    i. implementing block variance to Mean Absolute Difference (MAD) ratio-based edge detection;
    ii. implementing 4-neighbor block comparison-based edge detection;
    iii. implementing texture-like edge block differentiation;
    iv. implementing soft edge block differentiation;
    v. implementing isolated edge block elimination; and
    vi. selecting a transform from a plurality of transforms based on i-v; and
  b. a processing component coupled to the memory, the processing component for executing the application.

13. The device of claim 12 wherein the transform selected is a 4×4 discrete cosine transform if one of an edge macroblock and a flat macroblock is detected.

14. The device of claim 12 wherein the transform selected is an 8×8 discrete cosine transform if one of a texture-like edge macroblock and a non-edge macroblock is detected.

15. The device of claim 12 wherein the block variance to MAD ratio-based edge detection includes comparing the block variance to a threshold and an equation, $((MAD+n1)>>n2+K)*MAD$, to determine if the block is an edge, wherein n1, n2 and K are constants, wherein n1 and n2 are related to block size and K is based on numerical empirical results.

16. The device of claim 12 wherein the 4-neighbor block comparison-based edge detection uses additional variance information to adjust K in equation, $((MAD+n1)>>n2+K)*MAD$, wherein n1, n2 and K are constants, wherein n1 and n2 are related to block size and K is based on numerical empirical results.

17. The device of claim 12 wherein the 4-neighbor block comparison-based edge detection uses previous block edge detection results to adjust K in equation, $((MAD+n1)>>n2+K)*MAD$, wherein n1, n2 and K are constants, wherein n1 and n2 are related to block size and K is based on numerical empirical results.

18. The device of claim 12 wherein the texture-like edge block differentiation includes dividing the block into four sub-blocks, calculating variances for the sub-blocks and using the variances to determine if a first set of conditions is met to determine if the block is a texture-like edge block.

19. The device of claim 12 wherein the soft edge block differentiation includes dividing the block into four sub-blocks, calculating variances for the sub-blocks and using the variances to determine if a second set of conditions is met to determine if the block is a soft edge block.

20. The device of claim 12 wherein the isolated edge block elimination includes denoting the block as a non-edge block if no neighboring blocks are edge blocks.

21. The device of claim 12 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

22. A system implemented on a computing device, the system comprising:
  a. a block variance to Mean Absolute Difference (MAD) ratio-based edge detection component for detecting an edge block;
  b. a 4-neighbor block comparison-based edge detection component coupled to the block variance to MAD ratio-based edge detection component, the 4-neighbor block comparison-based edge detection component for detecting the edge block;
  c. a texture-like edge block differentiation component coupled to the 4-neighbor block comparison-based edge detection component, the texture-like edge block differentiation component for differentiating the edge block based on texture-like edge block differentiation comprising determining a minimum sub-block variance is within a range and a ratio between a maximum sub-block variance and the minimum sub-block variance is small;
  d. a soft edge block differentiation component coupled to the texture-like edge block differentiation component, the soft edge block differentiation component for differentiating the edge block;
  e. an edge block elimination component coupled to the soft edge block differentiation component, the edge block elimination component for eliminating the edge block; and
  f. a transform selection component coupled to the edge block elimination component, the transform selection component for selecting a transform from a plurality of transforms.

23. The system of claim 22 wherein at least one of the block variance to MAD ratio-based edge detection component, the 4-neighbor block comparison-based edge detection component, the texture-like edge block differentiation component, the soft edge block differentiation component, the edge block elimination component and the transform selection component is implemented in hardware.

24. The system of claim 22 wherein at least one of the block variance to MAD ratio-based edge detection component, the 4-neighbor block comparison-based edge detection component, the texture-like edge block differentiation component, the soft edge block differentiation component, the edge block elimination component and the transform selection component is implemented in software.

25. The system of claim 22 wherein the transform selection component selects a 4×4 discrete cosine transform if one of an edge macroblock and a flat macroblock is detected.

26. The system of claim 22 wherein the transform selection component selects an 8×8 discrete cosine transform if one of a texture-like edge macroblock and a non-edge macroblock is detected.

27. The system of claim 22 wherein the block variance to MAD ratio-based edge detection component compares the block variance to a threshold and an equation, $((MAD+n1)>>n2+K)*MAD$, to determine if the block is an edge, wherein n1, n2 and K are constants, wherein n1 and n2 are related to block size and K is based on numerical empirical results.

28. The system of claim 22 wherein the 4-neighbor block comparison-based edge detection component uses additional variance information to adjust K in equation, $((MAD+n1)>>n2+K)*MAD$, wherein n1, n2 and K are constants, wherein n1 and n2 are related to block size and K is based on numerical empirical results.

29. The system of claim 22 wherein the 4-neighbor block comparison-based edge detection component uses previous block edge detection results to adjust K in equation, $((MAD+n1)>>n2+K)*MAD$, wherein n1, n2 and K are constants, wherein n1 and n2 are related to block size and K is based on numerical empirical results.

30. The system of claim 22 wherein the texture-like edge block differentiation component divides the block into four sub-blocks, calculating variances for the sub-blocks and using the variances to determine if a first set of conditions is met to determine if the block is a texture-like edge block.

31. The system of claim 22 wherein the soft edge block differentiation includes dividing the block into four sub-blocks, calculating variances for the sub-blocks and using the variances to determine if a second set of conditions is met to determine if the block is a soft edge block.

32. The system of claim 22 wherein the isolated edge block elimination includes denoting the block as a non-edge block if no neighboring blocks are edge blocks.

33. The system of claim 22 wherein the computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

* * * * *